(12) United States Patent
Akiyama

(10) Patent No.: US 7,852,712 B2
(45) Date of Patent: Dec. 14, 2010

(54) TIME ADJUSTMENT DEVICE, TIMEKEEPING DEVICE WITH A TIME ADJUSTMENT DEVICE, AND A TIME ADJUSTMENT METHOD

(75) Inventor: Toshikazu Akiyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 379 days.

(21) Appl. No.: 12/145,392

(22) Filed: Jun. 24, 2008

(65) Prior Publication Data
US 2009/0033554 A1 Feb. 5, 2009

(30) Foreign Application Priority Data
Jul. 31, 2007 (JP) ............... 2007-199090

(51) Int. Cl.
*G04C 11/02* (2006.01)
(52) U.S. Cl. .................... 368/47; 342/357.06
(58) Field of Classification Search ............ 368/47; 342/357.01, 357.06
See application file for complete search history.

(56) References Cited

U.S. PATENT DOCUMENTS

| 6,212,133 | B1 | 4/2001 | McCoy et al. | |
|---|---|---|---|---|
| 6,611,756 | B1 * | 8/2003 | Chen et al. | 701/213 |
| 2004/0225439 | A1 * | 11/2004 | Gronemeyer | 701/213 |
| 2006/0145917 | A1 * | 7/2006 | Miyano et al. | 342/357.12 |
| 2006/0250302 | A1 * | 11/2006 | Park et al. | 342/357.1 |
| 2007/0063890 | A1 | 3/2007 | Yu | |

FOREIGN PATENT DOCUMENTS

| EP | 1 092 987 A2 | 4/2001 |
|---|---|---|
| JP | 2001-059864 | 3/2001 |
| WO | 01/75470 A1 | 10/2001 |

* cited by examiner

*Primary Examiner*—Vit W Miska
*Assistant Examiner*—Sean Kayes

(57) ABSTRACT

A time adjustment device has a satellite signal reception unit that receives satellite signals transmitted segmented into segments from a positioning information satellite; a time information acquisition unit that acquires time information from the satellite signal; a segment identifier acquisition unit that acquires a segment identifier for the segment containing the time information; a corresponding identifier calculation unit that calculates a corresponding segment identifier that corresponds to the segment identifier based on the time information; and a segment identifier evaluation unit that determines if the segment identifier is correct based on the segment identifier and the corresponding segment identifier.

5 Claims, 15 Drawing Sheets

| PAGE ID | SVID IN SUBFRAME 5 |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 51 |

FIG.14

TIME ADJUSTMENT DEVICE, TIMEKEEPING DEVICE WITH A TIME ADJUSTMENT DEVICE, AND A TIME ADJUSTMENT METHOD

CROSS-REFERENCE TO RELATED APPLICATIONS

Japanese Patent application No. 2007-199090 is hereby incorporated by reference in its entirety.

BACKGROUND

1. Field of Invention

The present invention relates to a time adjustment device that corrects the time based on signals from a positioning information satellite such as a GPS satellite, to a timekeeping device that has the time adjustment device, and to a time adjustment method.

2. Description of Related Art

The Global Positioning System (GPS) for determining the position of a GPS receiver uses GPS satellites that circle the Earth on a known orbit, and each GPS satellite has an atomic clock on board. Each GPS satellite therefore keeps the time (referred to below as the GPS time) with extremely high precision.

A GPS receiver that receives signals from GPS satellites must receive the TOW (Time Of Week) signal contained in the signals from a GPS satellite in order to get the time information transmitted by the GPS satellite. The TOW signal is the GPS time, and more specifically is the number of seconds from the beginning of each week. See, for example, Japanese Unexamined Patent Appl. Pub. JP-A-2001-59864.

The received signals are transmitted from GPS satellites orbiting at an altitude of approximately 20,000 km, and the received data may therefore contain errors. A parity check is therefore applied to detect if there is an error in the data.

A parity check involves segmenting the transmitted data stream into a specified number of blocks, appending the result (parity bit) of an operation on the bits of each block to the end of each block, and transmitting this parity bit with the data. The receiver determines there are no errors in the data if the appended parity bit matches the result of the same operation applied to the bits of the data block.

If a different data stream with the same parity is received, however, the parity check may determine that the data stream is correct, and the time may therefore be adjusted based on the wrong time information.

SUMMARY OF INVENTION

A time adjustment device, a timekeeping device with a time adjustment device, and a time adjustment method according to the present invention enable quickly and reliably determining if there are any errors in the time information received from a positioning information satellite.

A time adjustment device according to a preferred aspect of the invention has a satellite signal reception unit that receives satellite signals transmitted segmented into segments from a positioning information satellite; a time information acquisition unit that acquires time information from the satellite signal; a segment identifier acquisition unit that acquires a segment identifier for the segment containing the time information; a corresponding identifier calculation unit that calculates a corresponding segment identifier that corresponds to the segment identifier based on the time information; and a segment identifier evaluation unit that determines if the segment identifier is correct based on the segment identifier and the corresponding segment identifier.

This aspect of the invention has a time information acquisition unit that acquires time information from the satellite signal, a segment identifier acquisition unit that acquires a segment identifier for the segment containing the time information, a corresponding identifier calculation unit that calculates a corresponding segment identifier that corresponds to the segment identifier based on the time information, and a segment identifier evaluation unit that determines if the segment identifier is correct based on the segment identifier and the corresponding segment identifier.

The content of the time information differs according to the segment in which it is contained. For example, the Z count, which is an example of time information, in subframe 1, which is an example of a segment identifier, is the time of the beginning of the next segment, which is subframe 2 in this example.

The time information is thus intrinsically related to the segment containing the time information. As a result, the time information acquisition unit acquires the time information (such as the Z count) and the segment identifier acquisition unit gets the segment identifier (such as the subframe 1 identifier).

The corresponding segment identifier calculation unit can thus compute a corresponding segment identifier (such as the value "1" after the operation is completed) based on the Z count. The result of this operation is a reliable value because there is a constant, fixed relationship between the Z count and the subframe number (1).

The segment identifier evaluation unit then compares this corresponding segment identifier (such as 1) with the acquired segment identifier (such as subframe 1) to quickly and reliably determine if the time information (such as the Z count) is correct.

Because the numeric values "1" match in this example, the information is determined to be correct. If these values differ, however, there is an error in the received satellite signal, and the satellite signal is received again.

Even in cases in which the parity check that is conventionally applied can overlook data errors, the method of the invention can reliably and unfailingly determine if the data is correct, and can therefore shorten the time synchronization time.

Preferably, the satellite signal contains page information for identifying a plurality of identical segment identifiers identifying segments containing different information. The time adjustment device also has a page information acquisition unit that acquires the page information, a corresponding page information calculation unit that calculates corresponding page information corresponding to the page information based on the time information, and a page information evaluation unit that determines if the page information is correct based on the page information and the corresponding page information.

In this aspect of the invention the satellite signal contains page information for identifying a plurality of identical segment identifiers identifying segments containing different information, and the time adjustment device also has a page information acquisition unit that acquires the page information, a corresponding page information calculation unit that calculates corresponding page information corresponding to the page information based on the time information, and a page information evaluation unit that determines if the page information is correct based on the page information and the corresponding page information.

More particularly, the satellite signal contains a plurality of, such as 25, identical segment identifiers, such as subframe 5. While the segment identifier, subframe 5 in this example, is the same, the content of the corresponding segments is different, and the 25 segment identifiers are therefore discriminated from each other using page information such as a page number.

This page information, such as the page number, is closely related to the time information, such as the Z count, by means of the segment identifier, such as subframe 5. For example, the time information of the Z count in subframe 5 of page 25, the page information, denotes the time of the beginning of the next subframe, subframe 1.

The page information, such as page 25, in the segment identifier, such as subframe 5, thus has a constant regular relationship to the time information, such as the Z count.

The page information acquisition unit thus acquires page information (such as "25") that discriminates the segment identifier (such as subframe 5). The corresponding page calculation unit then computes the corresponding page information (such as "25") for the page information based on the acquired time information (such as the Z count).

The resulting value is reliable because the page information (such as "25") in the segment identifier (such as subframe 5) has a constant ordered relationship to the time information (such as the Z count).

The page information evaluation unit then determines if the actual page information is correct based on the actual page information acquired by the page information acquisition unit and the computed corresponding page information (such as "25").

If these values ("25" in this example) match, the information is correct. If the values do not match, there is an error in the received satellite signal and the satellite signal is received again.

Even in cases in which the parity check that is conventionally applied can overlook data errors, the method of the invention can reliably and unfailingly determine if the data is correct, and can therefore shorten the time synchronization time.

In another aspect of the invention the segments contain a plurality of subdivisions, and of these subdivisions the time information subdivision containing the time information contains subdivision identification information enabling discriminating the time information subdivision from other subdivisions; and the time adjustment device also has a time information subdivision signal reception determination unit that determines if the satellite signal reception unit received the satellite signal for the time information subdivision; and a subdivision identification information evaluation unit that determines if the subdivision identification information is present in the satellite signal for the time information subdivision.

In this aspect of the invention the segments contain a plurality of subdivisions, and of these subdivisions the time information subdivision containing the time information contains subdivision identification information enabling discriminating the time information subdivision from other subdivisions; and the time adjustment device also has a time information subdivision signal reception determination unit that determines if the satellite signal reception unit received the satellite signal for the time information subdivision; and a subdivision identification information evaluation unit that determines if the subdivision identification information is present in the satellite signal for the time information subdivision.

The segments (such as subframes) of the satellite signal contain a handover word (HOW) (ten words constitute one subframe) as an example of the time information subdivision, and if this time information subdivision (such as the HOW) is received, the time information (such as the Z count) is also received simultaneously.

The time information subdivision (such as the HOW) contains subdivision identification information (such as a prescribed bit being 0) that enables discriminating the time information subdivision from other subdivisions (such as other words).

As a result, if the time information subdivision signal reception determination unit determines that the satellite signal corresponding to the time information subdivision (such as the HOW) was received, the subdivision identification information evaluation unit determines if the subdivision identification information (such as the prescribed bit being set to 0) is in the time information subdivision (such as the HOW). If the subdivision identification information is present, the time information subdivision (such as the HOW) is determined to be correct. If the subdivision identification information is not present, the subdivision is determined to not be the time information subdivision (such as the HOW), and the satellite signal is received again.

Even in cases in which the parity check that is conventionally applied can overlook data errors, the method of the invention can reliably and unfailingly detect the subdivision containing the time information, and can therefore shorten the time synchronization time.

Another aspect of the invention is a timekeeping device with a time adjustment device having a satellite signal reception unit that receives satellite signals transmitted segmented into segments from a positioning information satellite; a time information acquisition unit that acquires time information from the satellite signal; a segment identifier acquisition unit that acquires a segment identifier for the segment containing the time information; a corresponding identifier calculation unit that calculates a corresponding segment identifier that corresponds to the segment identifier based on the time information; and a segment identifier evaluation unit that determines if the segment identifier is correct based on the segment identifier and the corresponding segment identifier.

Another aspect of the invention is a time adjustment method wherein a satellite signal reception unit has a satellite signal reception process that receives satellite signals transmitted segmented into segments from a positioning information satellite; a time information acquisition unit has a time information acquisition process that acquires time information from the satellite signal; a segment identifier acquisition unit has a segment identifier acquisition process that acquires a segment identifier for the segment containing the time information; a corresponding identifier calculation unit has a corresponding identifier calculation process that calculates a corresponding segment identifier that corresponds to the segment identifier based on the time information; and a segment identifier evaluation unit has a segment identifier evaluation process that determines if the segment identifier is correct based on the segment identifier and the corresponding segment identifier.

Other objects and attainments together with a fuller understanding of the invention will become apparent and appreci-

BRIEF DESCRIPTION OF THE DRAWINGS

FIG. 14 is a table of the page ID/subframe SVID values in FIG. 11.

DESCRIPTION OF THE PREFERRED EMBODIMENTS

Preferred embodiments of the present invention are described below with reference to the accompanying figures. Note that the following embodiments are preferred specific implementations of the invention and therefore describe some technically preferred limitations, but the scope of the invention is not limited thereto unless specifically stated as required by the invention.

Embodiment 1

Figure 1:
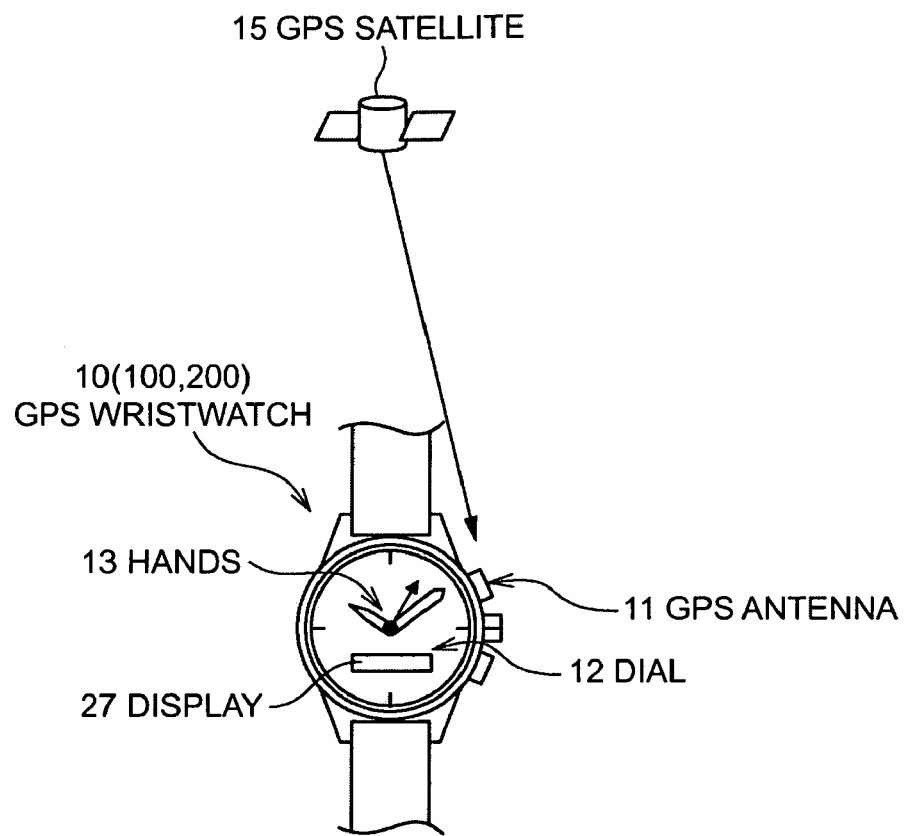
FIG. 1 is a schematic diagram of a wristwatch with a GPS time adjustment device as an example of a timekeeping device with a time adjustment device according to the present invention.
Figure 2:
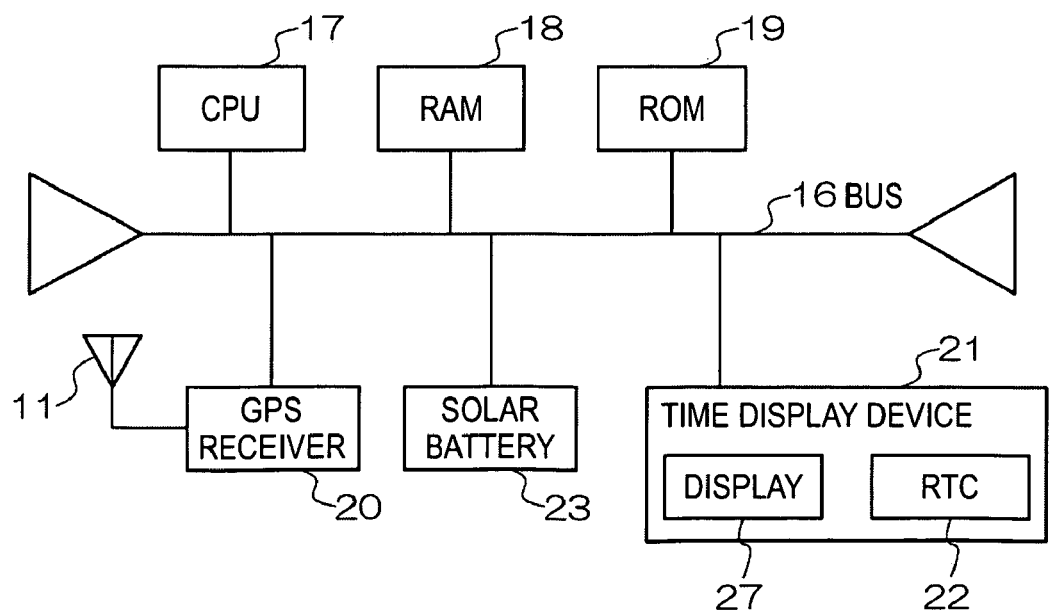
FIG. 2 is a block diagram of the main internal hardware arrangement of the wristwatch with GPS receiver.

FIG. 1 shows a wristwatch with a GPS time adjustment device 10 (referred to herein as a GPS wristwatch 10) as an example of a timekeeping device with a time adjustment device according to the present invention. FIG. 2 is a block diagram of the main internal hardware arrangement of the GPS wristwatch 10 shown in FIG. 1.

As shown in FIG. 1, the GPS wristwatch 10 has a dial 12 with hands 13 including a long hand and a short hand on the face, and a display 27 such as an LED display for presenting information and messages. The display 27 is not limited to an LED device and could be an LCD or an analog display.

As also shown in FIG. 1 the GPS wristwatch 10 also has an antenna 11. This antenna 11 is used for receiving signals from a GPS satellite 15 circling the Earth on a fixed orbit in space. The GPS satellite 15 is an example of a positioning information satellite that orbits the Earth.

As shown in FIG. 2, the GPS wristwatch 10 has an internal time display device 21 and GPS receiver 20, and components for functioning as a computer.

More particularly, the time display device 21 in this embodiment of the invention functions as an electronic timepiece. The components of the GPS wristwatch 10 shown in FIG. 2 are described below.

As shown in FIG. 2 the GPS wristwatch 10 has a bus 16. Connected to this bus 16 are a CPU (central processing unit) 17, RAM (random access memory) 18, and ROM (read-only memory) 19.

The GPS receiver 20 for receiving satellite signals transmitted from the GPS satellites 15 is also connected to the bus 16. The time display device 21 is also connected to the bus 16.

More specifically, the GPS receiver 20 includes the antenna 11, an RF unit that converts the signals received by the antenna 11 to an intermediate frequency, and a baseband unit that demodulates the received signals.

The GPS receiver 20 is more specifically a device for extracting a GPS signal from the signals received from a GPS satellite 15 in FIG. 1 by means of the antenna 11, an RF unit, and a baseband unit. The GPS receiver 20 is thus an example of a satellite signal reception unit.

The GPS signal (an example of a satellite signal) contains highly precise GPS time information (Z count) that is based on an atomic clock. The GPS signal is described further below.

The GPS receiver 20 is thus an example of a time information acquisition unit.

The time display device 21 connected to the bus 16 has a real-time clock (RTC) 22, which is an IC device (integrated circuit device) in this aspect of the invention, and a display 27. A solar battery 23 is also connected to the bus 16 as the power supply.

The bus 16 thus is an internal bus with addresses and data paths that function to connect all other devices. Various operating programs and information are stored in ROM 19, which is also connected to the bus 16. The CPU 17 uses RAM 18 to execute the programs and access ROM 19.

Figure 3:
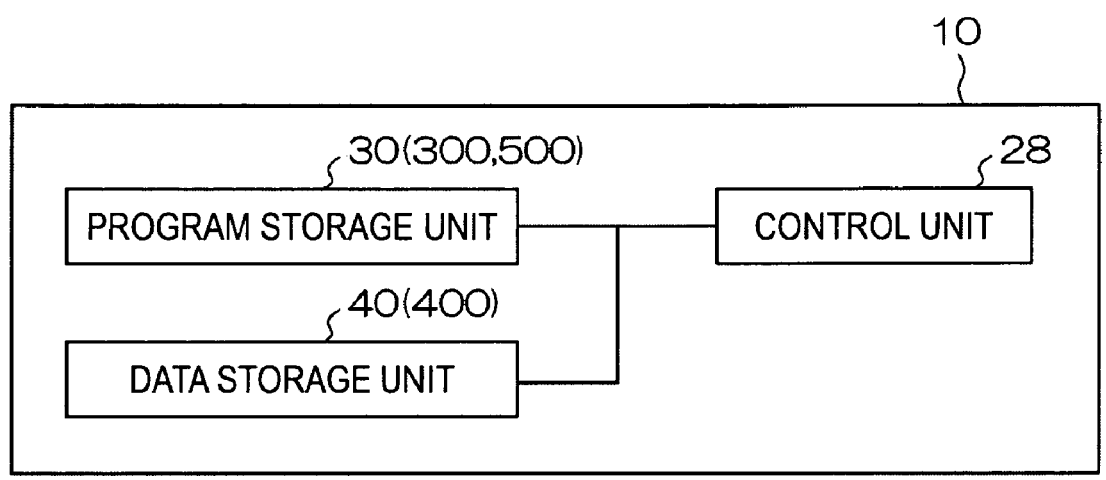
FIG. 3 is a block diagram showing the main software configuration of the wristwatch with GPS receiver.

FIG. 3 is a block diagram showing the general software configuration of the GPS wristwatch 10.

As shown in FIG. 3 the GPS wristwatch 10 has a control unit 28. The control unit 28 runs the programs stored in the program storage unit 30, and processes the data stored in the data storage unit 40.

The program storage unit 30 and data storage unit 40 are shown as discrete units in FIG. 3, but the data and programs are not actually stored separately and are simply shown this way for convenience.

Figure 4:
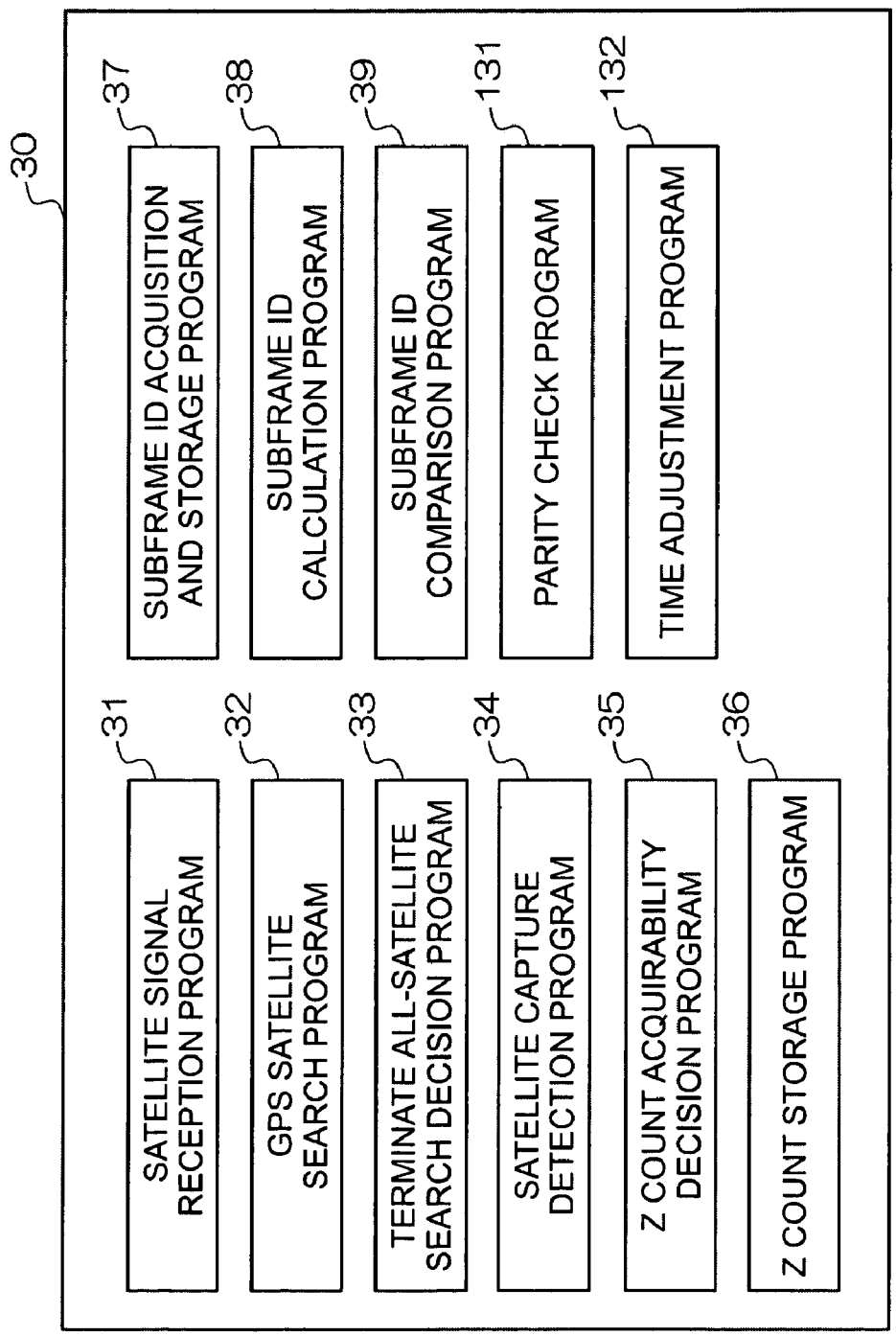
FIG. 4 is a block diagram showing the data stored in the program storage unit in FIG. 3.
Figure 5:
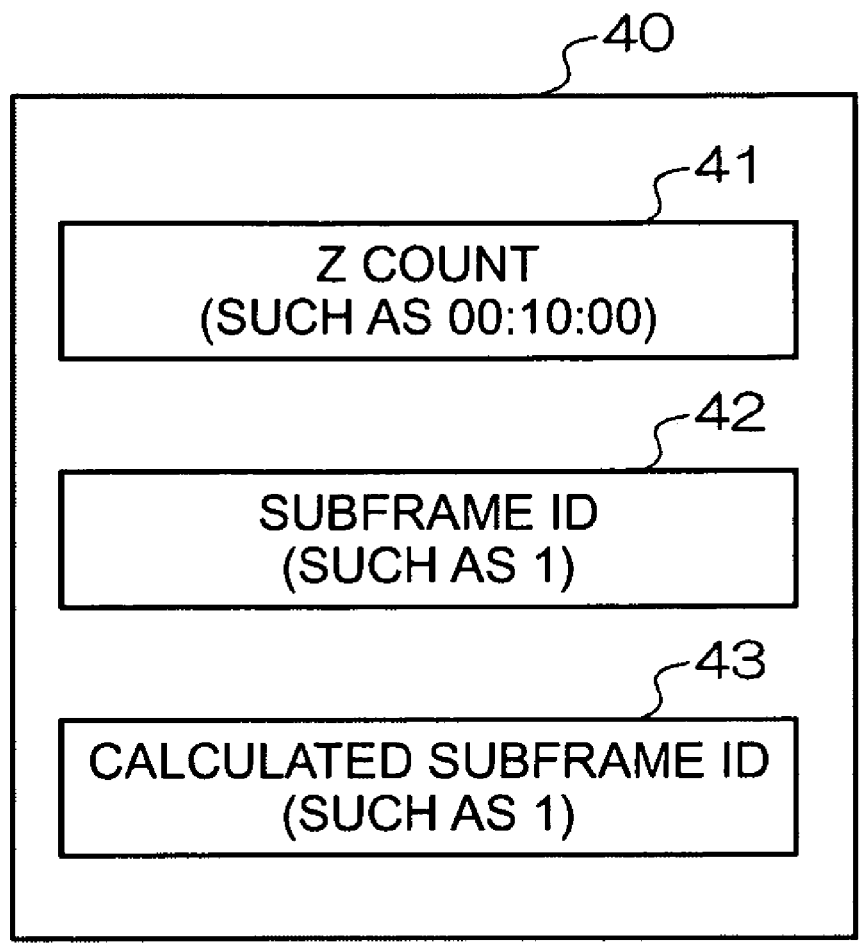
FIG. 5 is a block diagram showing the data stored in the data storage unit in FIG. 3.

FIG. 4 is a block diagram showing the data stored in the program storage unit 30 in FIG. 3. FIG. 5 is a block diagram showing data stored in the data storage unit 40 in FIG. 3.

Figure 6:
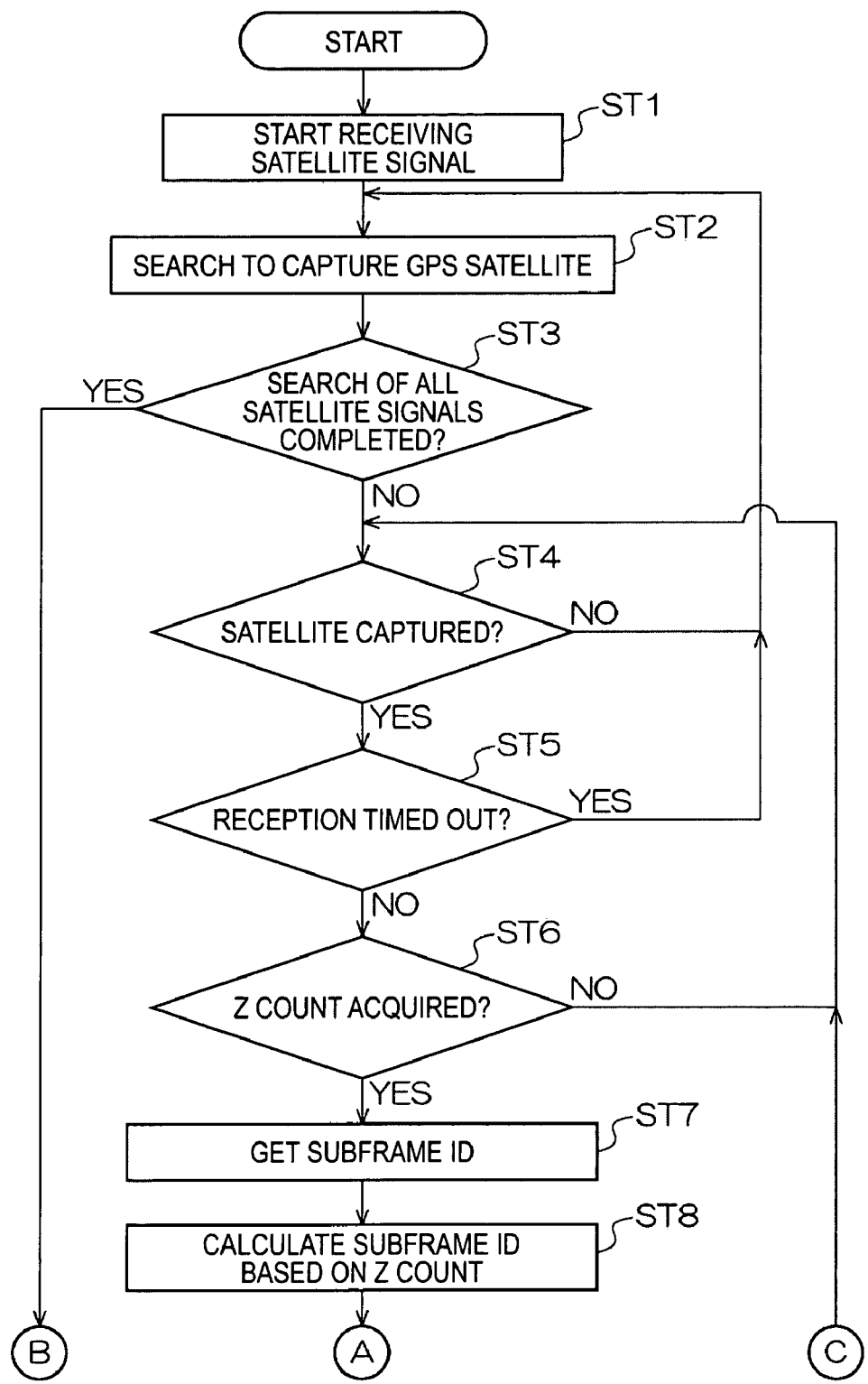
FIG. 6 is a flow chart of the operation of the wristwatch with GPS receiver according to the first embodiment of the invention.
Figure 7:
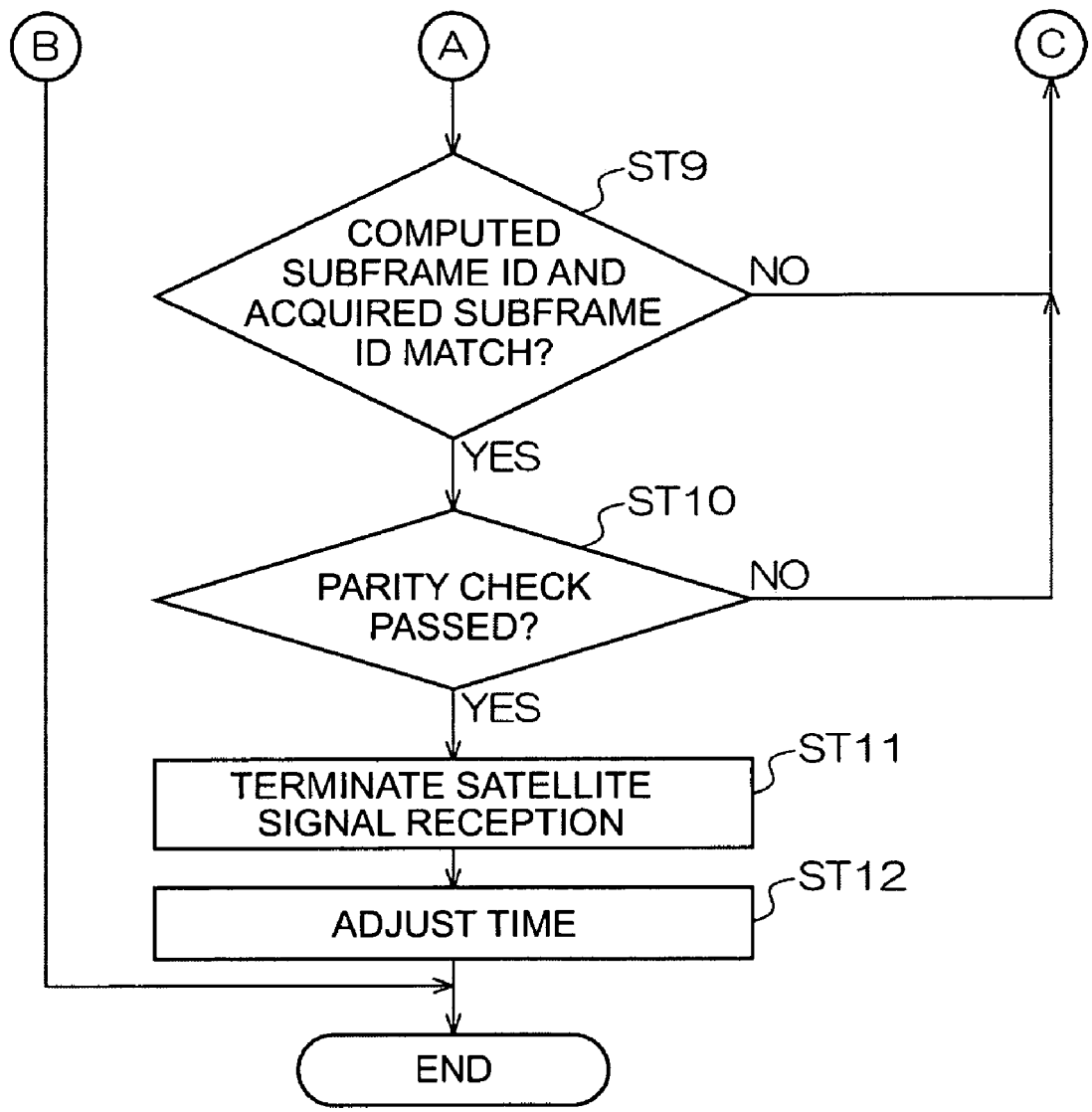
FIG. 7 is a flow chart of the operation of the wristwatch with GPS receiver according to the first embodiment of the invention.

FIG. 6 and FIG. 7 are flow charts describing the main steps in the operation of the GPS wristwatch 10 according to this embodiment of the invention.

The operation of the GPS wristwatch 10 according to this embodiment of the invention is described next with reference to the flow charts in FIG. 6 and FIG. 7. The programs and data shown in FIG. 4 and FIG. 5 are also described below in conjunction with the operation of the GPS wristwatch 10.

In order to adjust the time of the RTC 22 in FIG. 1, the GPS wristwatch 10 first starts the operation for receiving the satellite signal from a GPS satellite 15 in step ST1 in FIG. 6. More specifically, the satellite signal reception program 31 in FIG. 4 runs. Searching for a GPS satellite 15 to capture then begins in step ST2. This is an operation for capturing the signal transmitted by a GPS satellite 15 orbiting the Earth, and is executed by the GPS receiver 20 in FIG. 1, or more particularly by executing the GPS satellite search program 32 in FIG. 4.

Control then goes to step ST3. Whether a search for all satellites has been completed is determined in step ST3. More specifically, whether the search for all of the GPS satellites 15 orbiting the Earth has been completed is determined by executing the terminate all-satellite search decision program 33 in FIG. 4. If searching for all GPS satellites 15 is finished, the GPS satellite 15 capture operation ends in order to not waste power.

If searching for all GPS satellites 15 has not ended in step ST3, control goes to step ST4. Whether a GPS satellite 15 has been captured is determined in step ST4 by executing the satellite capture detection program 34 (an example of a satellite signal reception step).

If it is decided in step ST4 that a GPS satellite 15 has not been captured, control returns to step ST2. If it is decided in step ST4 that a GPS satellite 15 was captured, control goes to step ST5 to determine if the reception time has timed out. This is to prevent the GPS receiver 20 in FIG. 1 from continuing to operate for a long time when signal reception is not possible and thus prevent excessive power consumption.

If reception has timed out in step ST5, the procedure loops to step ST2. If reception has not timed out in step ST5, control goes to step ST6 to determine if the Z count has been acquired. The structure of the satellite signal transmitted from the GPS satellite 15 is described first below before describing step ST6.

FIG. 8 schematically describes a GPS signal.

Figure 8A:
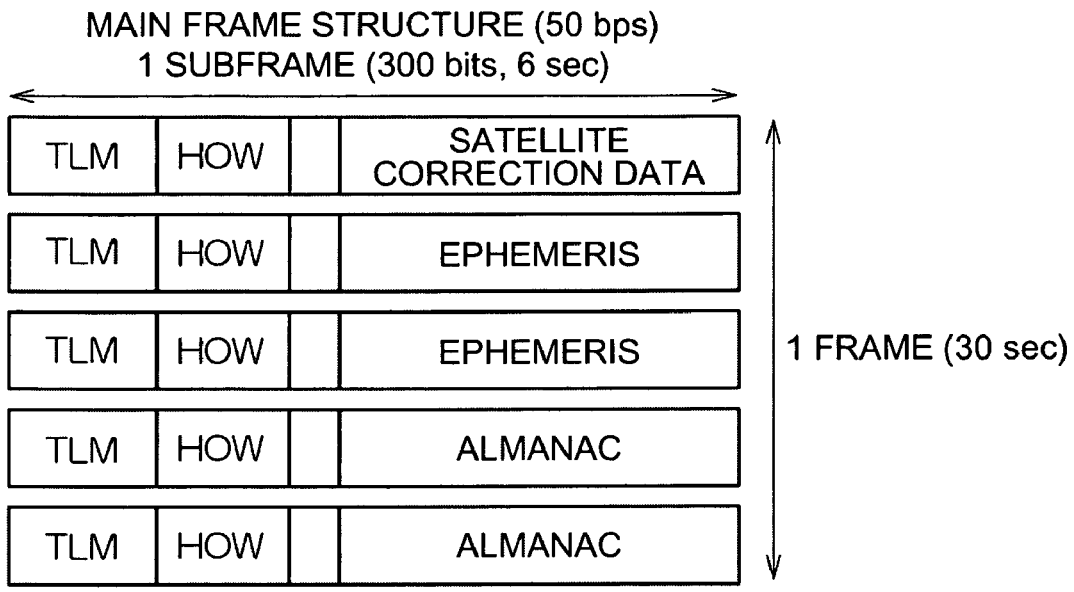
FIG. 8 schematically shows the structure of a GPS signal.

As shown in FIG. 8A, the GPS satellite 15 transmits signals in data frame units and transmits one frame every 30 seconds. Each frame consists of five subframes, and one subframe is transmitted every 6 seconds. Each subframe contains 10 words (1 word is transmitted every 0.6 second).

Figure 8B:
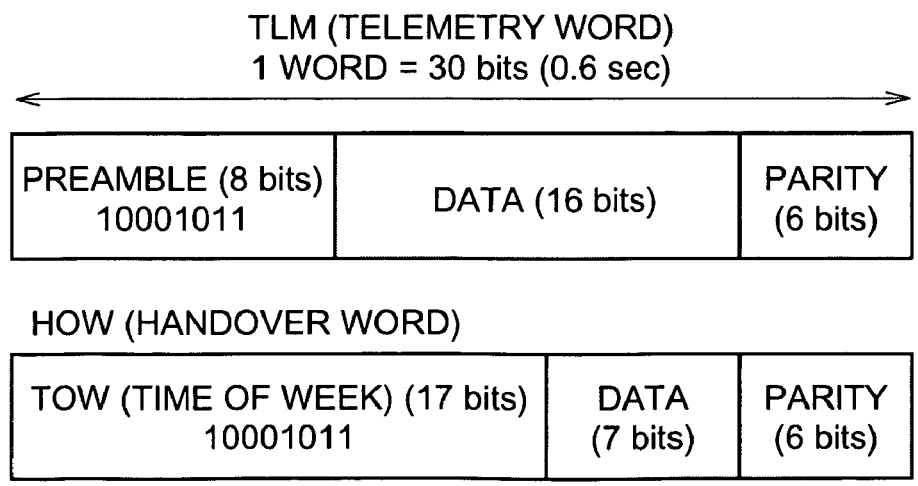

The first word in each subframe is a telemetry (TLM) word storing the TLM data, and each TLM word starts with a preamble as shown in FIG. 8B.

The TLM word is followed by a handover word HOW storing the HOW (handover word) data, and each HOW starts with the time of week (TOW) indicating the GPS time information (Z count) of the GPS satellite 15.

The Z count stores the time of the beginning of the TLM in the next subframe.

The GPS time is the number of seconds since 00:00:00 Sunday night of each week, and is reset to zero at precisely 00:00:00 every Sunday night.

Referring again to step ST6 in FIG. 6, whether the TOW data in the HOW of the satellite signal shown in FIG. 8B received from the GPS satellite 15 was received is determined in step ST6 (an example of a time information acquisition step).

If the TOW data was received, the time data (Z count) acquired by processing the TOW data renders highly precise GPS time information.

More specifically, whether the Z count was acquired is determined by running the Z count acquirability decision program 35 in FIG. 4. The acquired Z count, or more particularly the time at the beginning of the preamble of the TLM word in the next subframe, is stored as the Z count 41 in FIG. 5 by the Z count storage program 36 in FIG. 4. This Z count is a value such as 00:10:00.

If this time (Z count) is the time derived by operating on subframe 1, this time (Z count) is the time at the rise of the preamble of the TLM word in the next subframe, subframe 2.

However, the satellite signal from the GPS satellite 15 received by the GPS receiver 20 in FIG. 1 may contain errors as described above. If there are errors, the acquired data will be wrong and it will therefore not be possible to accurately correct the time of the RTC 22 in FIG. 1.

This embodiment of the invention therefore executes the steps starting from step ST7 when the Z count data is acquired in step ST6. However, if step ST6 determines that the Z count was not acquired, control returns to step ST4.

Figure 9:
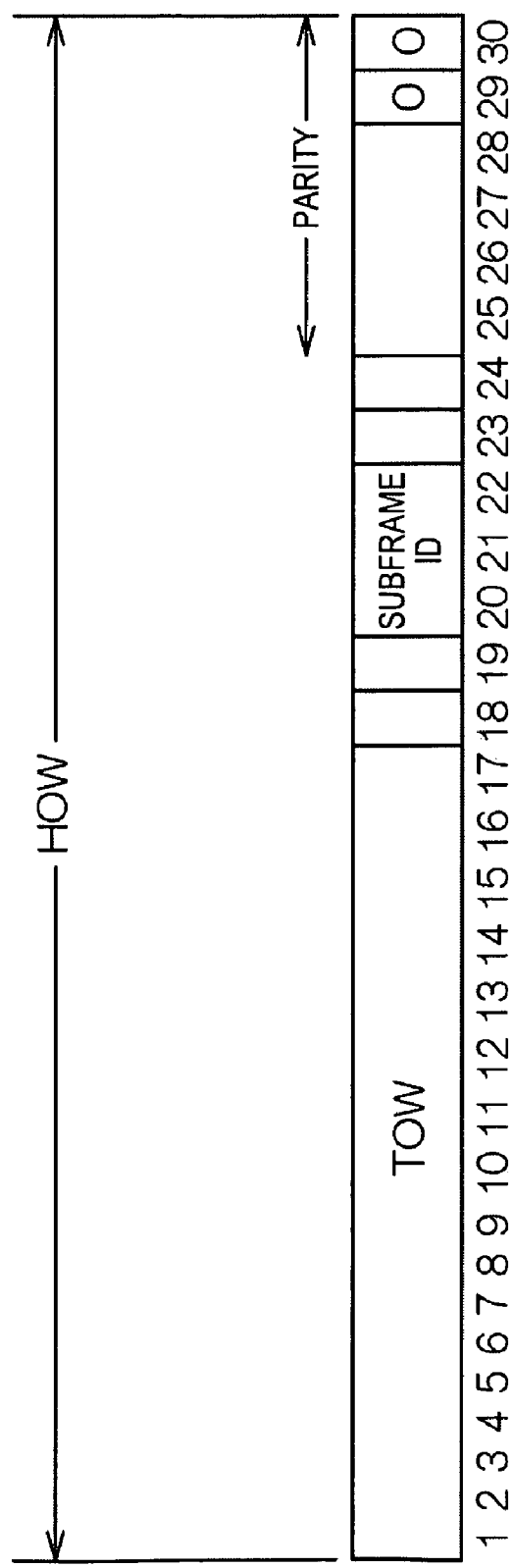
FIG. 9 schematically shows the HOW word shown in FIG. 8B.

The subframe ID is acquired in step ST7 (an example of a subframe identifier acquisition step). FIG. 9 schematically describes the handover word HOW in FIG. 8B.

As shown in FIG. 9 the HOW is 30 bits long, and the TOW data is carried in bits 1 to 17. Bits 20 to 22 contain the subframe ID, which is the number of the subframe carrying the HOW.

More specifically, if the HOW in FIG. 9 is the HOW in subframe 1, a value of 1 is sent as the subframe ID.

Step ST7 in FIG. 6 therefore acquires the subframe ID from bit 20 to bit 22 following the TOW in FIG. 9, and stores the result as the subframe ID 42 in FIG. 5.

More specifically, the subframe ID acquisition and storage program 37 in FIG. 4 runs to save the subframe ID, such as 1 in this example, as the subframe ID 42.

This subframe ID acquisition and storage program 37 is an example of a segment identifier acquisition unit, the subframe is an example of a signal segment, and the subframe ID number is an example of a segment identifier.

Control then goes to step ST8 to calculate the subframe ID based on the Z count (an example of a corresponding identifier calculation step). That is, the time referred to as the Z count in the TOW data in FIG. 9 is the time of the beginning of the preamble at the start of the next subframe, and this time information is therefore intrinsically related to the subframes.

More particularly, the Z count is acquired by multiplying the TOW data by four. The subframe ID is synchronized to the Z count, and starts from subframe 1 at the beginning of each week. The following equation can therefore be applied to the TOW data to predict the ID of the subframe containing the TOW data, that is, the subframe number.

$$\text{subframe ID} = ((TOW + 4) \bmod 5) + 1$$

where mod is the remainder of dividing X by Y if XmodY.

More specifically, the subframe ID calculation program 38 runs in step ST8 to compute the above equation. That is, the TOW data that is the basis of the Z count is obtained from the Z count 41 in FIG. 5, and the TOW data is substituted in the above equation to get the subframe ID.

The subframe ID thus computed is then saved as the calculated subframe ID 43 in FIG. 5, and in this example is 1.

The subframe ID calculation program 38 is an example of a corresponding identifier calculation unit, and the calculated subframe ID 43 is an example of a corresponding segment identifier.

Control then goes to step ST9. In step ST9 the computed subframe ID is compared with the acquired subframe ID to detect a match (this step is an example of a segment identifier evaluation step).

That is, the subframe ID comparison program 39 in FIG. 4 operates to compare the subframe ID 42 with the calculated subframe ID 43 in FIG. 5 and determine if they match.

If they are the same, the received satellite signal is not the wrong signal, the TOW data is from the corresponding subframe, and the Z count (time information) acquired from the TOW data is highly reliable.

If the values do not match, there is an error in the data and the satellite signal must be received again.

The subframe ID comparison program 39 is thus an example of a segment identifier evaluation unit.

If step ST9 does not detect a match, control returns to step ST4. Control goes to step ST10 if a match is confirmed.

Step ST10 detects if the parity check was successful. This parity check is done using bit 29 and bit 30 in the previous word, and bit 25 and bit 28 in the current word as shown in FIG. 9. The result of the parity check determines if there is an error in the data. More specifically, the parity check is done by the parity check program 131 in FIG. 4.

Whether there are any errors in the satellite signal data received from the GPS satellite 15 is confirmed by a parity check in this embodiment of the invention. However, because the parity check determines if an operation on certain bits in a specified data stream matches a certain value, there are cases in which the parity check could pass even though there are errors, and the Z count could be calculated and the time could be adjusted as a result of this parity check. The time cannot be adjusted with precision if this happens.

To prevent this, this embodiment of the invention does not rely only on the parity check, but also predicts the subframe ID by an operation applied to the received Z count, and determines if the predicted calculated subframe ID 43 matches the actually received subframe ID 42. Whether the received data is correct can thus be quickly and reliably determined.

If the parity check passes in step ST10, satellite signal reception ends in step ST11, and the time of the RTC 22 in FIG. 1 is adjusted in step ST12. More specifically, the time adjustment program 132 in FIG. 4 is executed.

If the parity check fails in step ST10, control returns to step ST4.

Embodiment 2

Figure 10:
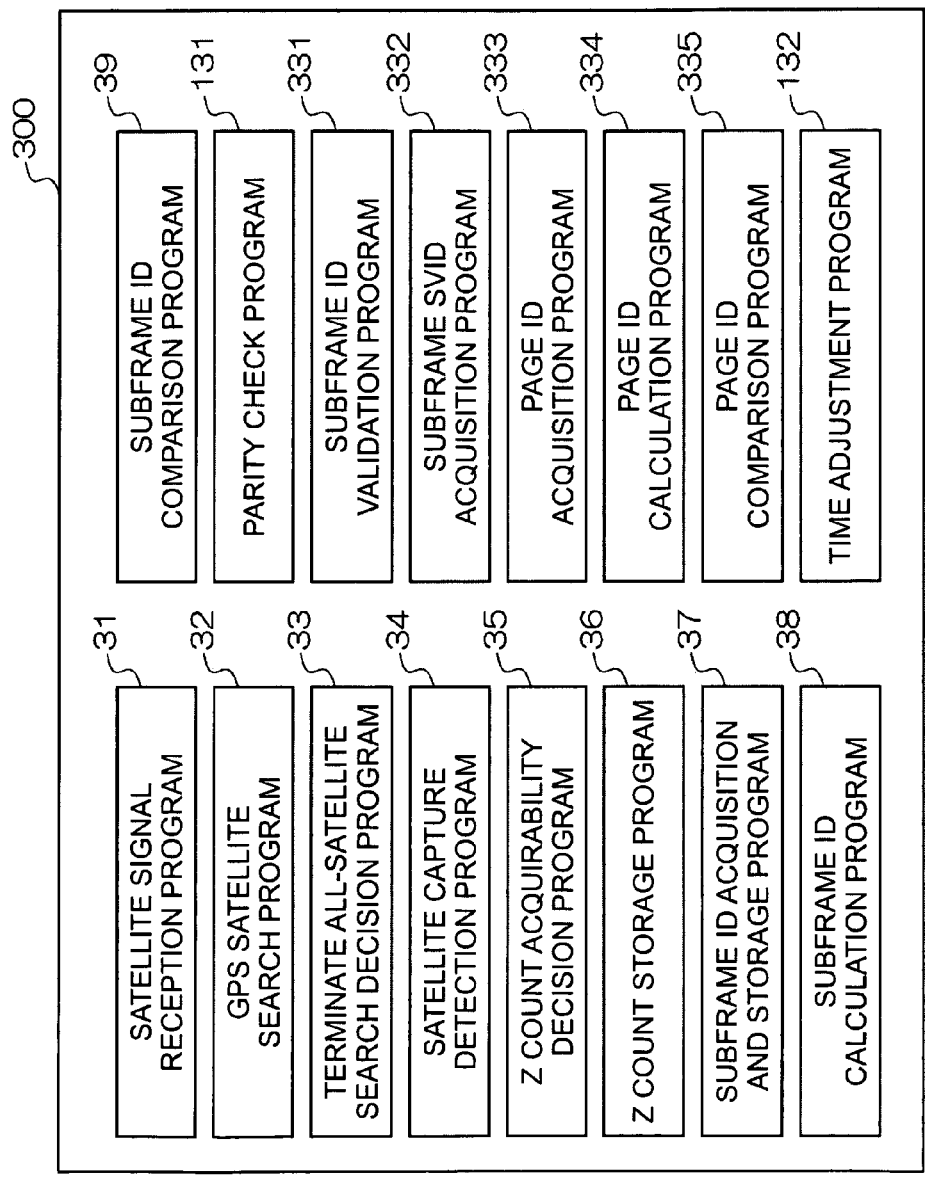
FIG. 10 is a block diagram of the main internal software configuration of the wristwatch with a GPS time adjustment device as an example of a timekeeping device with a time adjustment device according to a second embodiment of the invention.
Figure 11:
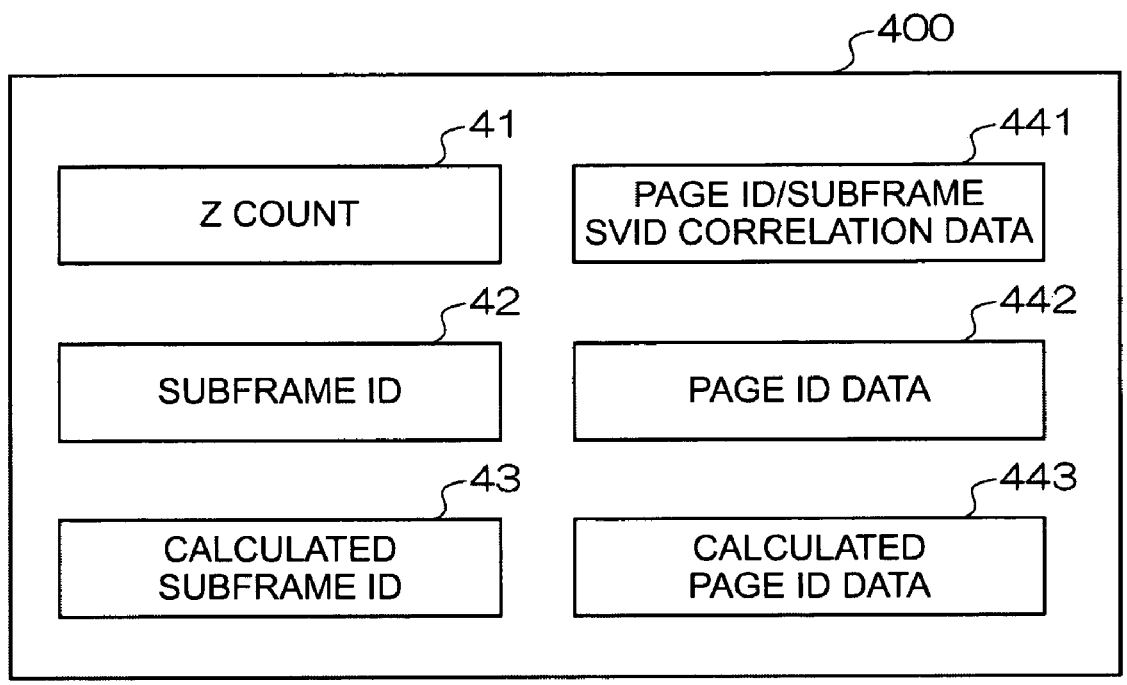
FIG. 11 is another block diagram of the main internal software configuration of the wristwatch with a GPS time adjustment device as an example of a timekeeping device with a time adjustment device according to a second embodiment of the invention.
Figure 12:
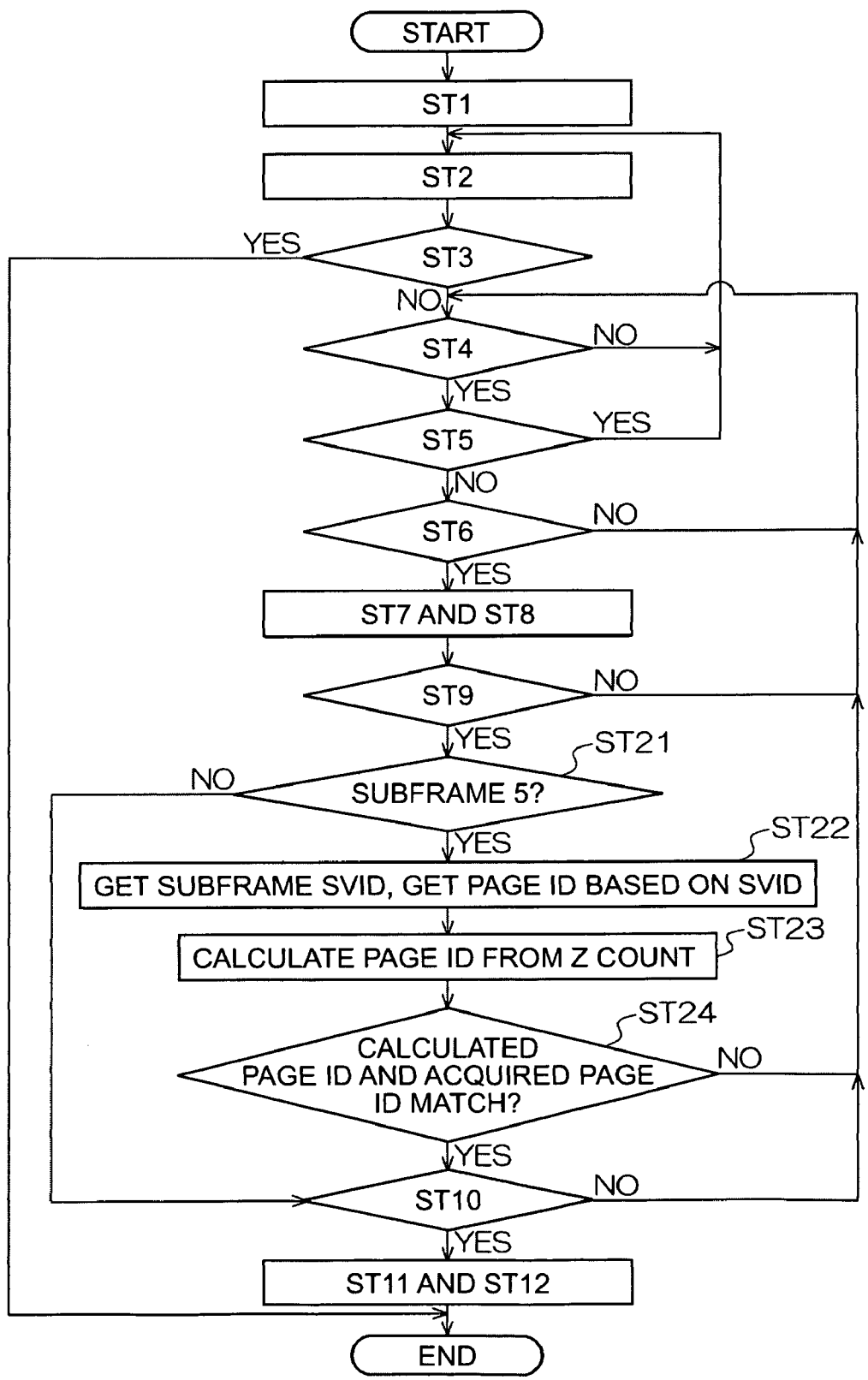
FIG. 12 is a flow chart of the operation of the wristwatch with a GPS time adjustment device according to a second embodiment of the invention.

FIG. 10 and FIG. 11 are block diagrams showing the main internal software configuration of a wristwatch with a GPS time adjustment device 100 described below as an example of a timekeeping device with a time adjustment device according to this second embodiment of the invention. FIG. 12 is a flow chart describing the main steps in the operation of the wristwatch with a GPS time adjustment device 100 according to this embodiment of the invention.

More specifically, FIG. 10 shows the data stored in the program storage unit 300 in this embodiment of the invention, and FIG. 11 shows the data stored in the data storage unit 400 in this embodiment of the invention.

The configuration of the wristwatch with GPS time adjustment device 100 according to this embodiment of the invention has many parts in common with the GPS wristwatch 10 described in the first embodiment, like parts are therefore identified by the same reference numerals, and the differences therebetween are described below.

The operation of this embodiment of the invention is described next referring to the flow chart in FIG. 12. This embodiment executes steps ST1 to ST9 as shown in FIG. 6 and FIG. 7 and described in the first embodiment above.

Steps ST10 to ST12 of the first embodiment are also executed in the same way. This embodiment thus differs from the first embodiment in inserting steps as shown in FIG. 12 between step ST9 and step ST10 in the first embodiment.

Therefore, before the parity check is executed in step ST10 in FIG. 12, whether the number of the received subframe is 5 is first determined in step ST21.

More specifically, the subframe ID validation program 331 in FIG. 10 runs and references the subframe ID 42 in FIG. 11.

Subframe 5 is described next. The satellite signal from a GPS satellite 15 contains five subframes as shown in FIG. 8. Of these subframes, subframe 5 contains almanac data containing orbital information for all of the GPS satellites. The almanac is large, cannot be contained in one subframe, and is therefore distributed between 25 subframes 5.

The satellite signal thus contains 25 subframes identified as subframe 5, and each subframe 5 can be uniquely identified by a page number, such as subframe 5 of page 3.

Therefore, if the subframe ID 42 acquired in step ST7 is 5, that is, subframe 5 is detected, which page this subframe 5 was acquired from must be determined.

This embodiment of the invention therefore detects in step ST21 in FIG. 12 whether subframe 5 was received, and control goes to step ST22 if subframe 5 is detected. If subframe 5 is not detected, control goes to step ST10.

In step ST22 the SVID of the received subframe 5 is acquired, and the page ID of this subframe 5 is acquired based on this subframe SVID.

More specifically, the subframe SVID acquisition program 332 in FIG. 10 operates as described further below. Note that the SVID is an example of page information.

Figure 13:
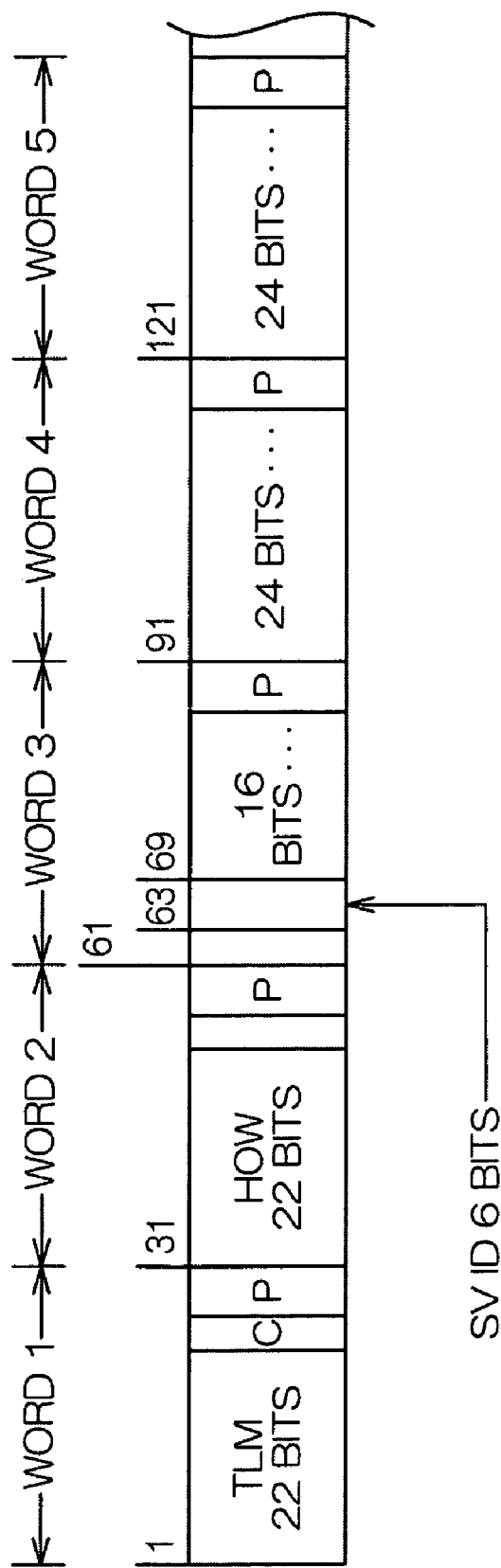
FIG. 13 is a schematic diagram showing five of the ten words in one subframe shown in FIG. 8A.

Each subframe contains ten words as shown in FIG. 8A, and FIG. 13 describes the five words in subframe 5.

As shown in FIG. 13 the third word in the subframe contains data, called the SVID, corresponding to the page ID of the subframe.

FIG. 14 is a table showing an example of the page ID/subframe SVID correlation data 441 in FIG. 11.

More specifically, the page ID corresponding to the SVID shown in FIG. 13, that is, the page number data, is stored in the table shown in FIG. 14.

After the subframe SVID acquisition program 332 in FIG. 10 runs and gets the SVID value in word 3 in FIG. 13, the page ID acquisition program 333 in FIG. 10 runs to get the page ID data 442 based on this SVID data and the page ID/subframe SVID correlation data 441 in FIG. 14.

The acquired page ID is then saved as the page ID data 442 in FIG. 11. In this example the page ID is page 10.

The subframe SVID acquisition program 332 is an example of a page information acquisition unit.

While it is good if the page ID data 442 is correct, the satellite signal transmitted from the GPS satellite 15 may contain errors. If these errors are not addressed, a correct Z count cannot be acquired and the time cannot be adjusted with good precision.

The page ID is therefore calculated from the Z count data in FIG. 11 in step ST23.

The page ID (see FIG. 14) and the Z count or other time information are closely related. For example, the time information of the Z count in subframe 5 of page 25 denotes the time of the beginning of the next subframe, subframe 1, and the page information, such as page 25 for this subframe 5, and time information, such as the Z count, have a fixed regular order.

More specifically, the page IDs in FIG. 14 are synchronized to the Z count of each subframe, and the page ID for the first page of each week is 1, that is, the signal restarts from page 1 every week.

The page ID of subframe 5 from which the TOW data was detected, that is, the page number, can therefore be predicted based on the TOW data using the following equation.

If the TOW equals 0, the page ID=1.

If the TOW does not equal 0, [(page ID)=((TOW−1)mod 25]+1 where mod is the remainder of dividing X by Y for XmodY.

The page ID calculation program 334 in FIG. 10 applies the above equation to compute the page ID based on the acquired TOW, and stores the result as the calculated page ID data 443 in FIG. 11.

The page ID calculation program 334 is an example of a corresponding page information operating unit.

Whether the calculated page ID and the acquired ID are the same is then determined in step ST24. More specifically, the page ID comparison program 335 in FIG. 10 runs to compare the page ID data 442 and the calculated page ID data 443 in FIG. 11.

If the values match, the data of the actually received page ID is correct, and the time is therefore adjusted based on the data in step ST12.

If the values do not match, there is a data error, control returns to step ST4, and the satellite signal is received again.

The page ID comparison program 335 is thus an example of a page information evaluation unit.

This embodiment of the invention can thus reliably determine the correctness of the page ID in subframes that differ according to the page number.

This embodiment of the invention then also applies a parity check (step ST10) to determine if there are any errors in the data.

That is, this embodiment of the invention can quickly detect an error without performing a parity check.

Embodiment 3

Figure 15:
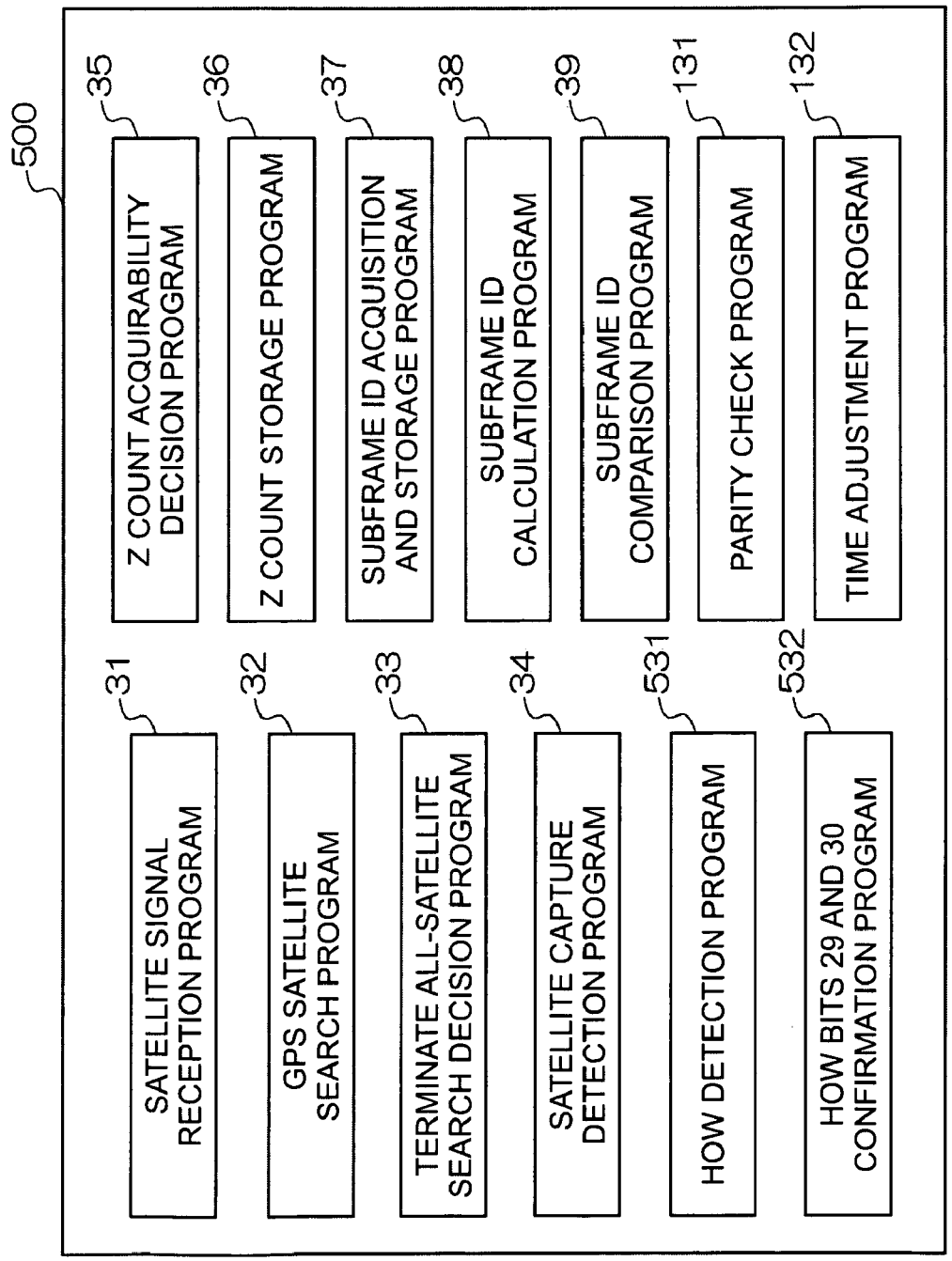
FIG. 15 is a block diagram of the main internal software configuration of the wristwatch with a GPS time adjustment device as an example of a timekeeping device with a time adjustment device according to a third embodiment of the invention.
Figure 16:
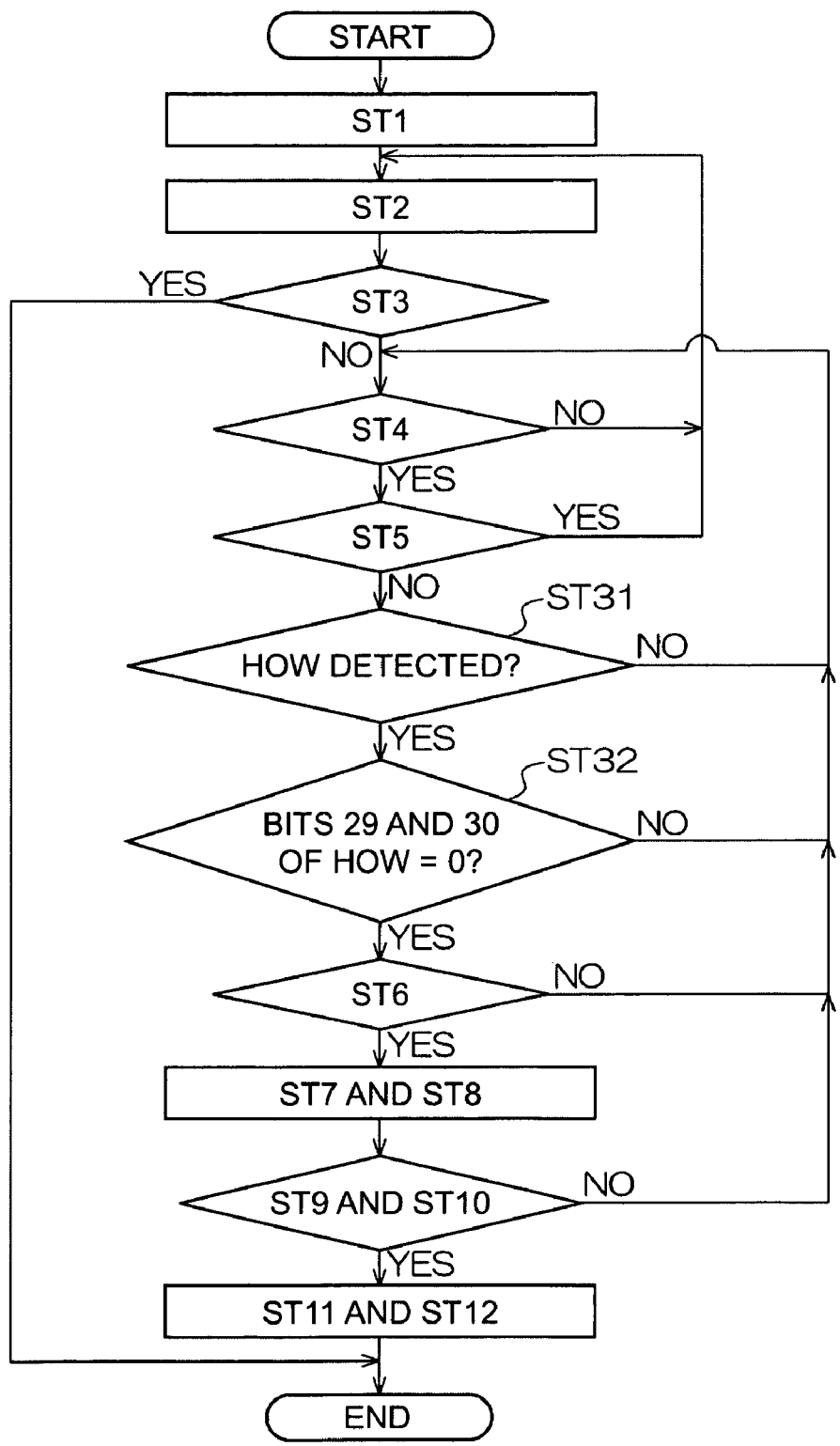
FIG. 16 is a flow chart of the operation of the wristwatch with GPS time adjustment device according to a third embodiment of the invention.

FIG. 15 is a block diagram showing the main internal software configuration of a wristwatch with a GPS time adjustment device 200 described below as an example of a timekeeping device with a time adjustment device according to this third embodiment of the invention. FIG. 16 is a flow chart describing the main steps in the operation of the wristwatch with a GPS time adjustment device 200 according to this embodiment of the invention.

More specifically, FIG. 15 shows the data stored in the program storage unit 500 in this embodiment of the invention.

The configuration of the wristwatch with GPS time adjustment device 200 according to this embodiment of the invention has many parts in common with the GPS wristwatch 10 described in the first embodiment, like parts are therefore identified by the same reference numerals, and the differences therebetween are described below.

The operation of this embodiment of the invention is described next referring to the flow chart in FIG. 16. This embodiment executes steps ST1 to ST5 as shown in FIG. 6 and FIG. 7 and described in the first embodiment above.

Steps ST6 to ST12 of the first embodiment are also executed in the same way. This embodiment thus differs from the first embodiment in inserting steps as shown in FIG. 16 between step ST5 and step ST6 in the first embodiment.

More specifically, if a satellite signal is captured in step ST4 in FIG. 16 and reception does not time out in step ST5, whether the HOW was detected is determined in step ST31. If the HOW was detected, whether bit 29 and bit 30 in the HOW are set to 0 is determined in step ST32.

This word is an example of a subdivision, and the HOW is an example of a time information subdivision. That bit 29 and bit 30 equal 0 is an example of subdivision identification information.

The meaning of adding these steps is described next. As shown in FIG. 9 and described in the first embodiment, the time data (Z count) is acquired based on the TOW data contained in the HOW. Therefore, if a part of the received satellite signal other than the HOW is mistakenly recognized as the HOW word, and bits 1 to 17 are read as the TOW data to get the Z count (time data), the time cannot be correctly adjusted with precision.

In this embodiment of the invention, therefore, the wristwatch with GPS time adjustment device 200 determines in step ST32 if data believed to be the HOW data was acquired. If data believed to be the HOW data was acquired, step ST32 determines if the HOW data is really a correct HOW word.

If the HOW is correct or not is determined as follows. As shown in FIG. 9 the HOW contains information that is not found in the other words, and this information is that bit 29 and bit 30 are always 0.

This embodiment of the invention uses this property of the HOW word to determine if the received data believed to be a HOW is actually a correct handover word.

This is further described with reference to FIG. 16. The HOW detection program 531 in FIG. 15 runs first in step ST31, and the wristwatch with GPS time adjustment device 200 determines if data believed to be the HOW of the satellite signal from the GPS satellite 15 was detected. If the data was not detected, control returns to step ST4. If the data was detected, control goes to step ST32.

The HOW bits 29 and 30 confirmation program 532 in FIG. 15 then runs in step ST32. More specifically, this program 532 determines if bit 29 and bit 30 in the received data believed to be a HOW are both set to 0. If bit 29 and bit 30 are 0, control goes to step ST6. If either bit 29 or bit 30 is not 0, control returns to step ST4.

The HOW detection program 531 is thus an example of a HOW detection program 531, and the HOW bits 29 and 30 confirmation program 532 is an example of a subdivision identification information evaluation unit.

Because this embodiment of the invention can verify if the received data is the handover word containing the TOW time data, erroneously recognizing other data as the HOW and acquiring erroneous time data based thereon can be quickly prevented.

The invention is not limited to the embodiments described above. The foregoing embodiments are described using GPS satellites that orbit the Earth as an example of a positioning information satellite. However, the positioning information satellite of the invention is not so limited, and includes geostationary satellites and quasi-zenith satellites, for example.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A time adjustment device comprising:
   a satellite signal reception unit that receives satellite signals transmitted segmented into segments from a positioning information satellite;
   a clock that maintains current time;
   a time information acquisition unit that acquires time of week information from the satellite signal;
   a segment identifier acquisition unit that acquires a segment identifier for the segment containing the time information;
   a corresponding identifier calculation unit that calculates a corresponding segment identifier that corresponds to the segment identifier based on the time of week information; and
   a segment identifier evaluation unit that determines if the segment identifier is correct based on the segment identifier and the corresponding segment identifier;
   wherein, if the segment identifier is determined to be correct, a processor updates the current time of the clock using the time of week information.

2. The time adjustment device described in claim 1, wherein:
   the satellite signal contains page information for identifying a plurality of identical segment identifiers identifying segments containing different information; and
   the time adjustment device further comprises
   a page information acquisition unit that acquires the page information;
   a corresponding page information calculation unit that calculates corresponding page information corresponding to the page information based on the time information; and
   a page information evaluation unit that determines if the page information is correct based on the page information and the corresponding page information.

3. The time adjustment device described in claim 1, wherein:
   the segments contain a plurality of subdivisions, and of these subdivisions the time information subdivision containing the time information contains subdivision identification information enabling discriminating the time information subdivision from other subdivisions; and
   the time adjustment device further comprises
   a time information subdivision signal reception determination unit that determines if the satellite signal reception unit received the satellite signal for the time information subdivision; and
   a subdivision identification information evaluation unit that determines if the subdivision identification information is present in the satellite signal for the time information subdivision.

4. A timekeeping device with a time adjustment device comprising:
   a satellite signal reception unit that receives satellite signals transmitted segmented into segments from a positioning information satellite;
   a clock that maintains current time;
   a time information acquisition unit that acquires time of week information from the satellite signal;
   a segment identifier acquisition unit that acquires a segment identifier for the segment containing the time information;
   a corresponding identifier calculation unit that calculates a corresponding segment identifier that corresponds to the segment identifier based on the time of week information; and
   a segment identifier evaluation unit that determines if the segment identifier is correct based on the segment identifier and the corresponding segment identifier;
   wherein, if the segment identifier is determined to be correct, a processor updates the current time of the clock using the time of week information.

5. A time adjustment method comprising:
   receiving, using a satellite reception unit, satellite signals from a positioning information satellite, the signals being segmented into segments;
   maintaining current time using a clock;
   acquiring, using a time information acquisition unit, time of week information from the satellite signal;
   acquiring, using a segment identifier acquisition unit, a segment identifier for the segment containing the time information;
   calculating, using a corresponding identifier calculator unit, a corresponding segment identifier that corresponds to the segment identifier based on the time information; and
   determining, using a segment identifier evaluation unit, if the segment identifier is correct based on the segment identifier and the corresponding segment identifier;
   wherein, if the segment identifier is determined to be correct, then the method further comprises, updating, using a processor, the current time of the clock using the time of week information.

* * * * *